US009401097B2

(12) United States Patent
Kim et al.

(10) Patent No.: US 9,401,097 B2
(45) Date of Patent: Jul. 26, 2016

(54) METHOD AND APPARATUS FOR PROVIDING EMOTION EXPRESSION SERVICE USING EMOTION EXPRESSION IDENTIFIER

(71) Applicants: Jong-Phil Kim, Uiwang-si (KR); Kwang-Il Kim, Seoul (KR)

(72) Inventors: Jong-Phil Kim, Uiwang-si (KR); Kwang-Il Kim, Seoul (KR)

( * ) Notice: Subject to any disclaimer, the term of this patent is extended or adjusted under 35 U.S.C. 154(b) by 264 days.

(21) Appl. No.: 13/926,146

(22) Filed: Jun. 25, 2013

(65) Prior Publication Data
US 2014/0004489 A1    Jan. 2, 2014

(30) Foreign Application Priority Data

Jun. 29, 2012  (KR) .................. 10-2012-0071240
Aug. 14, 2012  (KR) .................. 10-2012-0088687

(51) Int. Cl.
*G06F 7/00* (2006.01)
*G06F 17/30* (2006.01)
*G09B 19/00* (2006.01)

(52) U.S. Cl.
CPC ..................................... *G09B 19/00* (2013.01)

(58) Field of Classification Search
None
See application file for complete search history.

(56) References Cited

U.S. PATENT DOCUMENTS

| | | | |
|---|---|---|---|
| 5,754,843 A | 5/1998 | Imanaka et al. | |
| 2006/0112134 A1* | 5/2006 | Tsuboi et al. | 707/102 |
| 2006/0129927 A1* | 6/2006 | Matsukawa | 715/532 |
| 2010/0262597 A1* | 10/2010 | Han | 707/723 |
| 2012/0047447 A1* | 2/2012 | Haq | 715/752 |
| 2013/0132203 A1* | 5/2013 | Cheng | 705/14.58 |
| 2013/0231922 A1* | 9/2013 | Park et al. | 704/9 |
| 2013/0247078 A1* | 9/2013 | Nikankin | H04N 21/44204 725/13 |

FOREIGN PATENT DOCUMENTS

JP   09-6802 A        1/1997
KR   10-1143968 B1    5/2012

* cited by examiner

*Primary Examiner* — Robert Beausoliel, Jr.
*Assistant Examiner* — Michael Pham
(74) *Attorney, Agent, or Firm* — Novick, Kim & Lee, PLLC; Jae Youn Kim

(57) ABSTRACT

Disclosed are a method and apparatus for providing an emotion expression service using an emotion expression identifier. The method includes collecting emotion evaluations of users about content related to a word or a phrase, the emotion evaluations being performed by the users after the users view the content, and displaying an emotion expression identifier representing the collected emotion evaluations of the users in the vicinity of the word or the phrase. The method and apparatus enable a user to intuitively identify emotion expressions of other users (netizens) in relation to a word or phrase such on a Web page such as a portal site.

10 Claims, 11 Drawing Sheets

FIG. 8
HOT TOPICS
1. BMW 
2. iPhone5 
3. SON Ye Jin 
4. Yeosu EXPO 
5. Royal Concubines 

FIG. 9

HOT TOPICS

 ROOFTOP ROOM, PARK YU CHEON, HAN J IMIN 

 MC MONG, NOT GUILTY FOR EVASION OF MILITARY SERVICE 

 BEAUTIFUL DAUGHTER OF SUPER-RICH 

GROUP PICTURE AT JUNG JUN HA'S WEDDING

THE KING, HA JI WON, LEE SEUNG KI

LEE HI'S ESOTERIC PICTORIAL

LARGEST SCALE IN HANHWA'S BUSINESS HISTORY

NORTH KOREA, SOUTH-NORTH KOREA TALKS LAST YEAR

JAPANESE COMPANIES' OBLIGATION TO COMPENSATION FOR DRAFTED KOREANS

POLITICAL ARGUMENTS BETWEEN PARK JI WON AND PARK GEUN HYE

BY REGION (USER PANEL)

COLORED BASED ON REPRESENTATIVE EMOTIONS

●●●○○○

WHEN EMOTION COLOR IS CLICKED, NUMBERS
INDICATING 3 INTENSITY LEVELS ARE DISPLAYED

EMOTION STATISTICS
FOR TWENTIES

METHOD AND APPARATUS FOR PROVIDING EMOTION EXPRESSION SERVICE USING EMOTION EXPRESSION IDENTIFIER

This application claims the benefit of Korean Patent Application No. 10-2012-0071240, filed on Jun. 29, 2012, and Korean Patent Application No. 10-2012-0088687, filed on Aug. 14, 2012, which are hereby incorporated by reference as if fully set forth herein.

BACKGROUND OF THE INVENTION

1. Field of the Invention

The present invention relates to a method and apparatus for providing an emotion expression service using an emotion expression identifier, and more particularly, to a method and apparatus for enabling a user to intuitively identify emotions that other Web users (i.e. so-called netizens) feel about a word or phrase such as a recommended search keyword on a Web page such as a portal site.

2. Description of the Related Art

According to a popular search keyword providing service, the numbers of inputs of search keywords in search windows of Web pages are counted and search keywords are listed for a user in order of most searched to least searched in a predetermined window. When the user selects a specific search keyword from among the search keywords listed in the window, search results of content matching to the selected search keyword, including articles, videos, etc. are provided to the user so that the user may select a search result and view content corresponding to the search result.

Popular search keywords may be sorted by time of counting their inputs, for example, in real time, on a daily basis, on a weekly basis, on a monthly basis, etc. In addition, the popular search keywords may be sorted by content viewer group (e.g., teens, college students, single males, single females, etc.). The popular search keywords may also be sorted by keyword category (e.g., shopping, game, etc.). Further, the popular search keywords may be sorted on the basis of a combination of time of counting inputs, content viewer group, and keyword category (e.g., weekly hot search keywords for college students, monthly hot shopping keywords, etc.).

In this regard, a conventional popular search keyword providing service provides popular search keywords by displaying popular search keyword rankings 110 and ranking changes 120, as illustrated in FIG. 1.

Thus, a user can just identify top popular search keywords and their ranking changes, and there is no way for the user to directly know the emotions of other users (netizens) about content related to the search keywords, for example, information indicating whether the search keywords are related to positive or negative content.

Accordingly, the user cannot detect the emotions of other users about a popular search keyword (e.g. whether content related to the search keyword is positive or negative) until directly viewing the content related to the search keyword. Even though the user is interested only in the content of a specific feature, the user cannot efficiently view popular search keywords related to content of the intended feature.

SUMMARY OF THE INVENTION

The present invention is directed to a method and apparatus for providing an emotion expression service using an emotion expression identifier that substantially obviates one or more problems due to limitations and disadvantages of the related art.

An object of the present invention is to provide a method and apparatus for providing an emotion expression service using an emotion expression identifier, which enables a user to intuitively identify emotion expressions of other users (netizens) in relation to a word or phrase such as a recommended search keyword on a Web page such as a portal site.

Other objects of the invention will become readily apparent to those skilled in the art from the following embodiments.

According to an embodiment of the present invention, a method for providing an emotion expression service using an emotion expression identifier includes collecting emotion evaluations of users about content related to a word or a phrase, the emotion evaluations being performed by the users after the users view the content, and displaying an emotion expression identifier representing the collected emotion evaluations of the users in the vicinity of the word or the phrase.

According to another embodiment of the present invention, an apparatus for providing an emotion expression service using an emotion expression identifier includes a collector configured to collect emotion evaluations of users about content related to a word or a phrase, the emotion evaluations being performed by the users after the users view the content, and a display controller configured to display an emotion expression identifier representing the collected emotion evaluations of the users in the vicinity of the word or the phrase.

According to another embodiment of the present invention, a method for providing an emotion expression service using an emotion expression identifier includes collecting emotion evaluations of users about a specific place, and displaying an emotion expression identifier representing the collected emotion evaluations of the users at a point corresponding to a geographical position of the specific place on a map.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 and 8 illustrate an example of displaying popular search keywords along with emotion statistics charts representing users' selected emotions about the respective popular search keywords according to an embodiment of the present invention;

FIG. 9 illustrates an example of displaying popular search keywords along with representative emoticons corresponding to representative emotions that users express about the popular search keywords according to an embodiment of the present invention;

DETAILED DESCRIPTION OF THE INVENTION

Reference will now be made in detail to the preferred embodiments of the present invention, examples of which are illustrated in the accompanying drawings. However, this is not intended to limit the present invention to particular modes of practice, and it is to be appreciated that all changes, equivalents, and substitutes that do not depart from the spirit and technical scope of the present invention are encompassed in the present invention. Wherever possible, similar reference numbers will be used throughout the drawings to refer to the same or like parts.

Embodiments of the present invention will be described below in detail with reference to the accompanying drawings.

Figure 1:
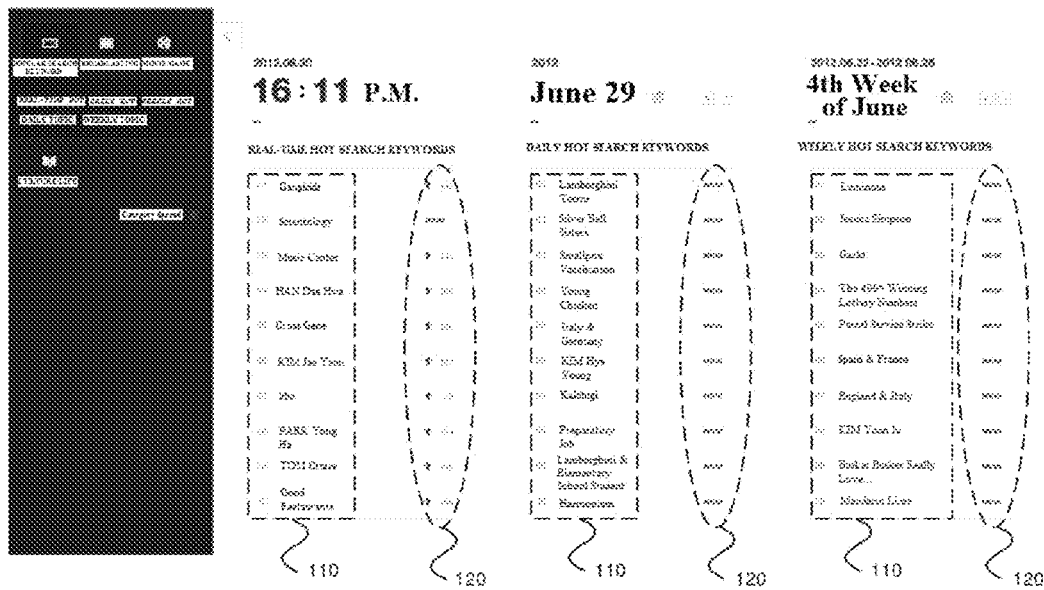
FIG. 1 illustrates the concept of a conventional search keyword recommending service.
Figure 2:
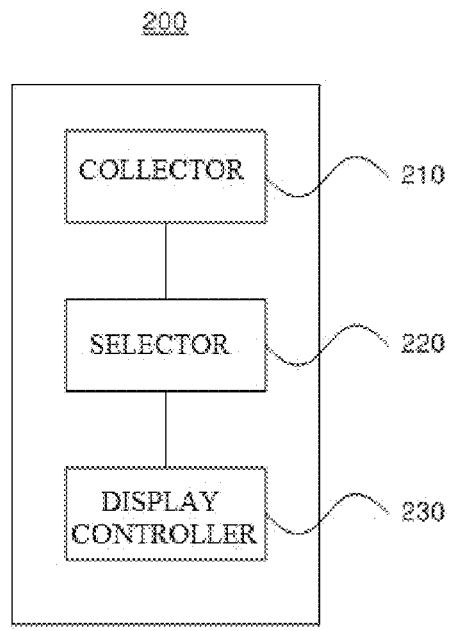
FIG. 2 is a block diagram of an apparatus for providing an emotion expression service using an emotion expression identifier according to an embodiment of the present invention.

FIG. 2 is a block diagram of an apparatus for providing an emotion expression service using an emotion expression identifier according to an embodiment of the present invention. Referring to FIG. 2, the apparatus 200 may include a collector 210, a selector 220, and a display controller 230.

Figure 3:
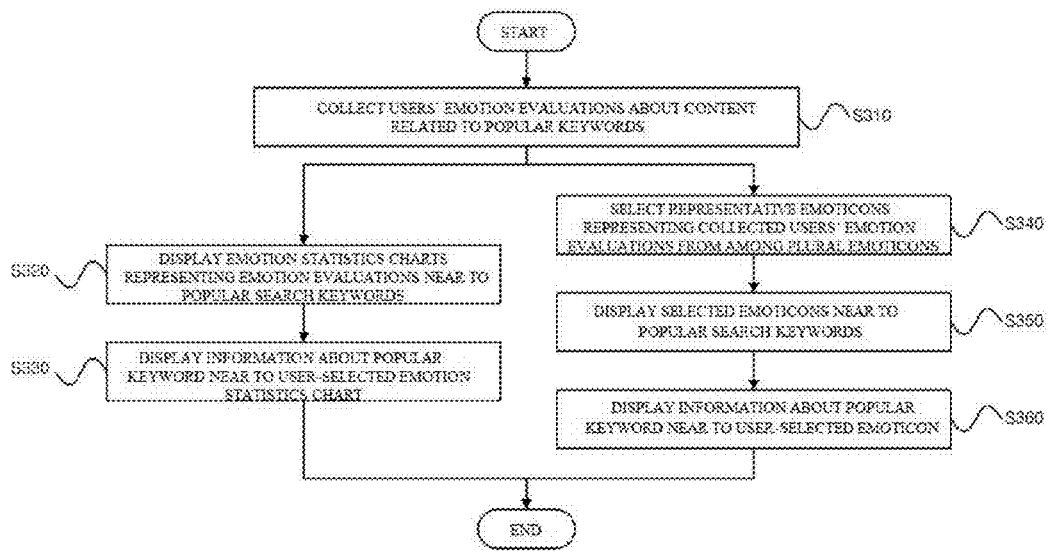
FIG. 3 is a flowchart illustrating a method for providing an emotion expression service using an emotion expression identifier according to an embodiment of the present invention.

FIG. 3 is a flowchart illustrating a method for providing an emotion expression service using an emotion expression identifier according to an embodiment of the present invention.

The apparatus and method for providing an emotion expression service using an emotion expression identifier according to the embodiments of the present invention are applicable, without limitations, to any type of search keyword-related services including a "popular search keyword providing service" and a "related search keyword providing service", and to a "linked search service". In the popular search keyword providing service, the numbers of inputs of words or phrases as search keywords in search windows are counted and the search keywords are arranged in order of most searched to least searched in a predetermined window. The related search keyword providing service provides search keywords related to words or phrases input as search keywords in search windows, along with search results matching to the input search keywords. If a specific word or phrase is selected (i.e. clicked) on a Web page, search results matching to the word or phrase as a search keyword are provided in the linked search service.

Particularly, the apparatus and method for providing an emotion expression service using an emotion expression identifier according to the embodiments of the present invention can be readily implemented in conjunction with the popular search keyword providing service. For clarity and convenience of description, embodiments of the present invention will be described in detail in the context of the popular search keyword providing service, by way of example. However, those skilled in the art will understand that the present invention is not limited to the popular search keyword providing service.

With reference to FIGS. 2 and 3, operations will be described below according to the function of each element and individual steps.

The collector 210 collects users' emotion evaluations about content related to popular search keywords each being a specific word or phrase in step S310. For example, content related to a specific popular search keyword may include an article, video, etc. about a specific issue. The specific popular search keyword may be related one or more pieces of content.

After a user accesses a Web page or the like displaying content related to a popular search keyword and views the content, the user may rate an emotion that the user feels about the content by means of an emotion evaluation tool available on the Web page. In this case, the collector 210 may collect emotion evaluations about all content related to each of the popular search keywords by receiving emotion evaluation results about the content related to the popular search keyword from a management server of each Web page that displays the content.

An emotion evaluation may be performed using a plurality of emotions classified according to at least one of emotion types and emotion levels defined for the emotion types. Herein, an emotion level refers to the intensity of an emotion.

In an embodiment of the present invention, emotions that users feel about content may be classified into 6 types: joy, surprise, fear, sadness, disgust, and anger.

If emotions are classified only by emotion type and 6 emotion types are defined, the number of final defined emotions is 6.

In an embodiment of the present invention, 3 emotion levels (level 1, level 2, and level 3) may be defined for each emotion type.

For example, peace, pleasure, and happiness may be classified as level 1, level 2, and level 3 for joy, respectively; doubt, perplexity, and astonishment may be classified as level 1, level 2, and level 3 for surprise, respectively; and concern, fear, and shiver may be classified as level 1, level 2, and level 3 for fear, respectively. Sadness may have sadness, discouragement, and grief as level 1, level 2, and level 3, respectively, disgust may have boredom, antipathy, and hatred as level 1, level 2, and level 3, respectively, and anger may have hostility, anger, and rage as level 1, level 2, and level 3, respectively.

If emotions are classified according to both emotion types and emotion levels, there are 6 emotion types, and each emotion type has 3 emotion levels, a total of 18 emotions (6×3) are finally defined.

Figure 4:
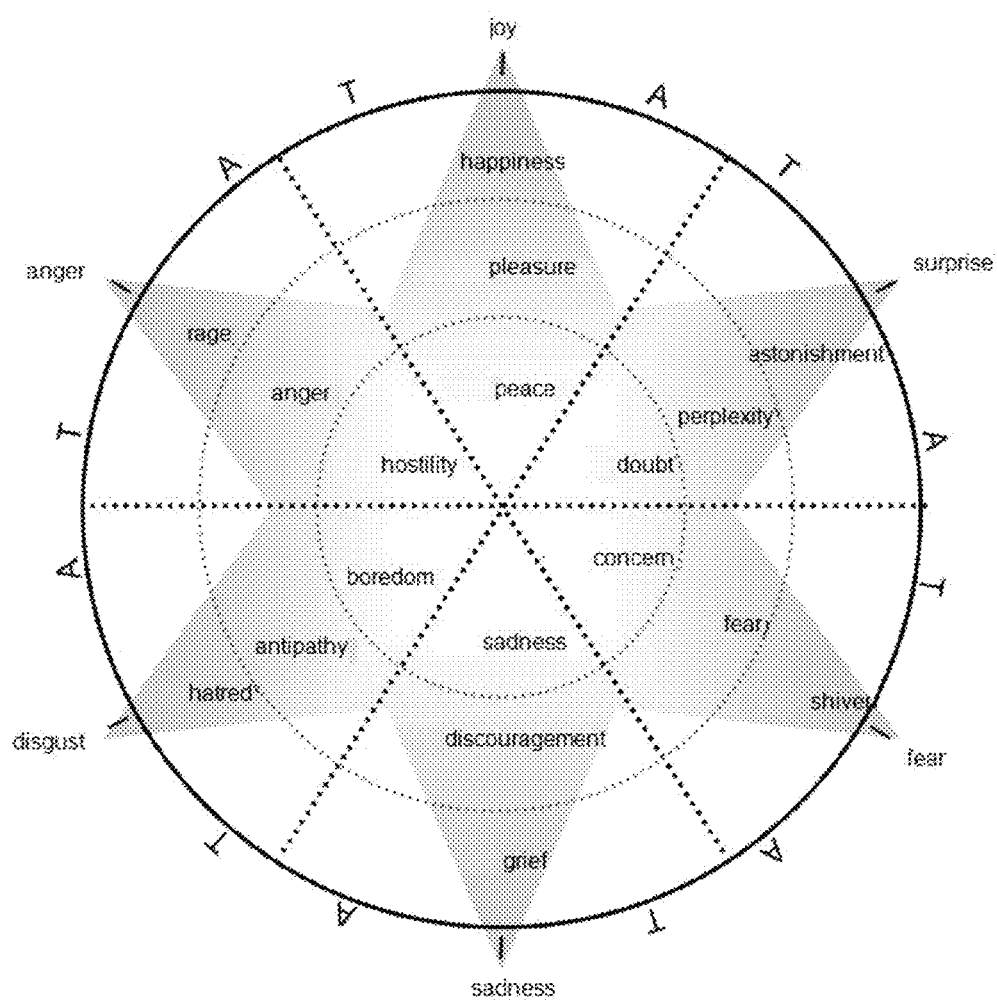
FIG. 4 is an exemplary pie chart (circular graph) illustrating classifications of emotions by emotion type and emotion level according to an embodiment of the present invention.

FIG. 4 is a pie chart (i.e. a circle graph) illustrating classifications of emotions by emotion type and emotion level according to an embodiment of the present invention.

The pie chart of FIG. 4 is divided into one or more sectors corresponding to emotion type zones for respective emotion types. Each emotion type zone includes one or more emotion level zones corresponding to one or more emotion levels. That is, the pie chart of FIG. 4 includes a plurality of emotion type zones and a plurality of emotion zones are included in each emotion type zone occupying a sector according to the emotion type of emotions corresponding to the emotion zones.

One or more emotion zones may be sequentially arranged in a radial direction from the center of the circle according to their emotion levels. While emotions are arranged in an ascending order of their emotion levels from the center of the circle toward the circumference of the circle in FIG. 4, it may be contemplated as another embodiment of the present invention that emotions are arranged in a descending order of their emotion levels from the center of the circle toward the circumference of the circle.

Such a pie chart may be used as a tool for displaying emotion evaluation statistics of users (netizens). Hereinafter, the pie chart illustrated in FIG. 4 will be referred to as an "emotion statistics chart" and a detailed description will be given below of displaying emotion evaluation statistics using the emotion statistics chart.

In an embodiment of the present invention, the emotions may be represented by a plurality of emoticons. Each emoticon may represent one of the plurality of emotions. Accordingly, one or more emoticons may belong to one emotion.

The emoticons may be based on text, still images, or moving images (referred to as text emotions, image emoticons, and animated emoticons, respectively).

Figure 5:
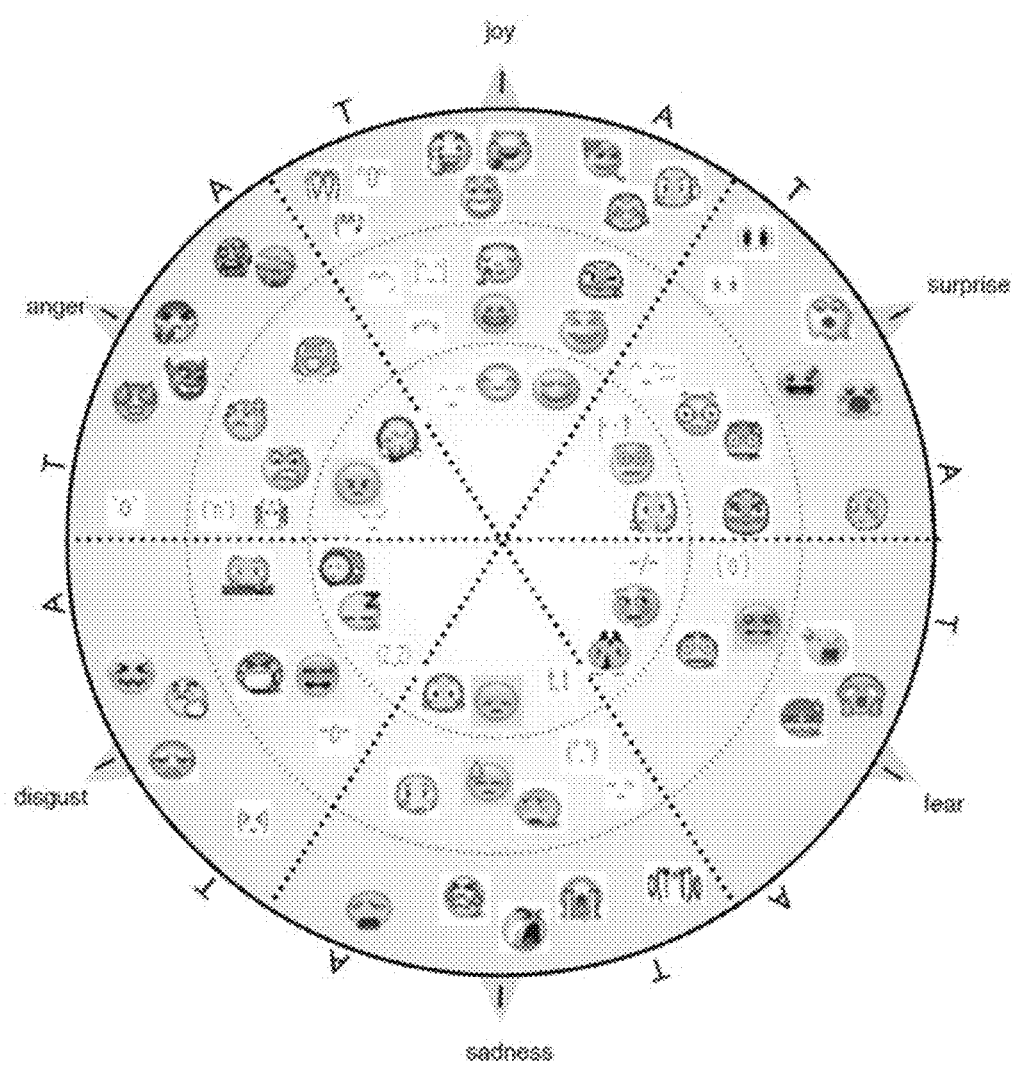
FIG. 5 is an exemplary pie chart illustrating a plurality of emoticons classified by emotion type according to an embodiment of the present invention.

FIG. 5 is an exemplary pie chart illustrating a plurality of emoticons classified by emotion type according to an embodiment of the present invention. The positions of emotion types and emotion levels (i.e. the positions of emotions) in the pie chart of FIG. 5 are identical to those illustrated in the pie chart of FIG. 4. In FIG. 5, "T" represents a text emoticon, "I" represents an image emoticon, and "A" represents an animated emoticon.

As explained earlier, a user may rate his/her emotion about content using an emotion evaluation tool displayed along with the content on a Web page. The emotion evaluation tool may include a UI (referred to as an "emotion evaluation UI") taking the form of the graph illustrated in FIG. 4 or the graph including a plurality of emoticons, illustrated in FIG. 5.

If the emotion evaluation UI illustrated in FIG. 4 is used as an emotion evaluation tool, the user may evaluate an emotion about the content by selecting one of the plurality of emotion zones included in the emotion evaluation UI. On the other hand, if the emotion evaluation UI illustrated in FIG. 5 is used as an emotion evaluation tool, the user may evaluate an emotion about the content by selecting one of the plurality of emoticons included in the emotion evaluation UI. That is, the user may perform emotion evaluation by inputting a signal that selects an emotion zone or an emoticon in the emotion evaluation UI by means of an input device (e.g. a mouse or a keyboard) interworking with a terminal that displays content.

Figure 6:
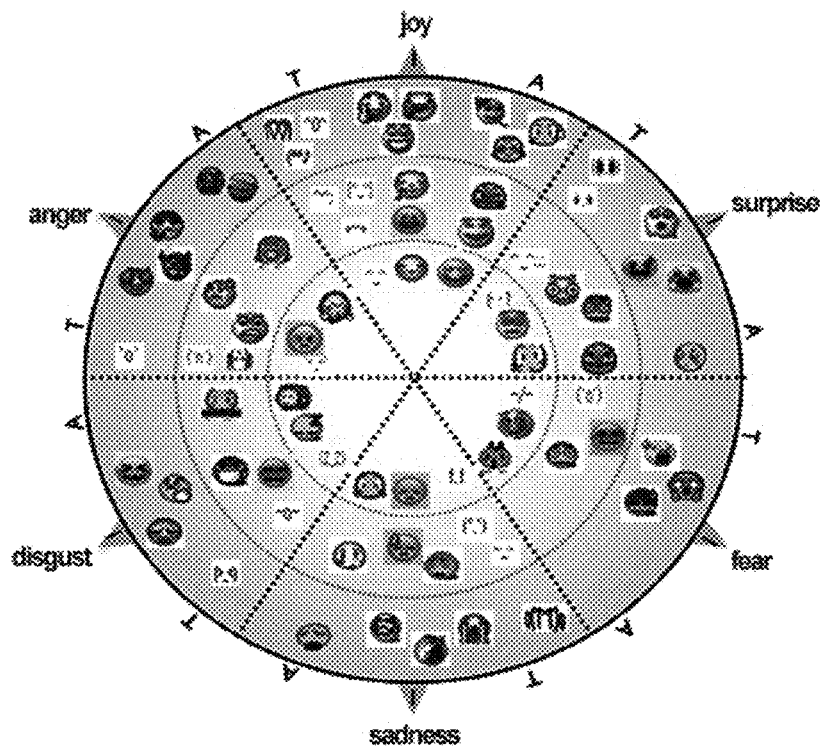
FIG. 6 illustrates an exemplary news article as content, having an emotion evaluation User Interface (UI) at its bottom according to an embodiment of the present invention.

FIG. 6 illustrates an exemplary news article as content, together with the emotion evaluation UI illustrated in FIG. 5 at its bottom. Of course, an emotion evaluation UI taking the form illustrated in FIG. 4 may also be displayed at the bottom of the news article.

The foregoing emotion statistics charts and emoticons are exemplary tools for expressing users' emotions. Hereinafter, a tool with which to express emotions will be referred to as an "emotion expression ID".

Embodiments of the present invention for displaying emotion expression IDs representing collected users' emotions will be described in detail, in separate cases of using emotion statistics charts and emoticons as emotion expression IDs.

1. Emotion Statistics Chart as Emotion Expression ID

In an embodiment of the present invention, after viewing content, a user may evaluate his/her emotion about the content by means an emotion evaluation UI as illustrated in FIG. 4. For example, the user may evaluate an emotion about the content by selecting an emotion zone corresponding to the emotion from among the plurality of emotion zones included in the emotion evaluation UI illustrated in FIG. 4. Many other users that have viewed the content may evaluate their emotions about the content in the same manner.

Then the display controller 230 may display emotion statistics charts representing collected users' emotion evaluations in the vicinity of respective popular search keywords in step S320. That is, the display controller 230 may display an emotion statistics chart made by collecting users' emotion evaluations about content related to each popular search keyword in the vicinity of the popular search keyword.

As emotion evaluations about content related to each popular search keyword are accumulated, the display controller 230 may display the statistics of emotion expressions about the content by adjusting one of the colors, brightness levels, and chroma levels of the plurality of emotion zones based on the numbers of selecting the emotion zones in the emotion statistics chart corresponding to the popular search keyword.

Figure 7:
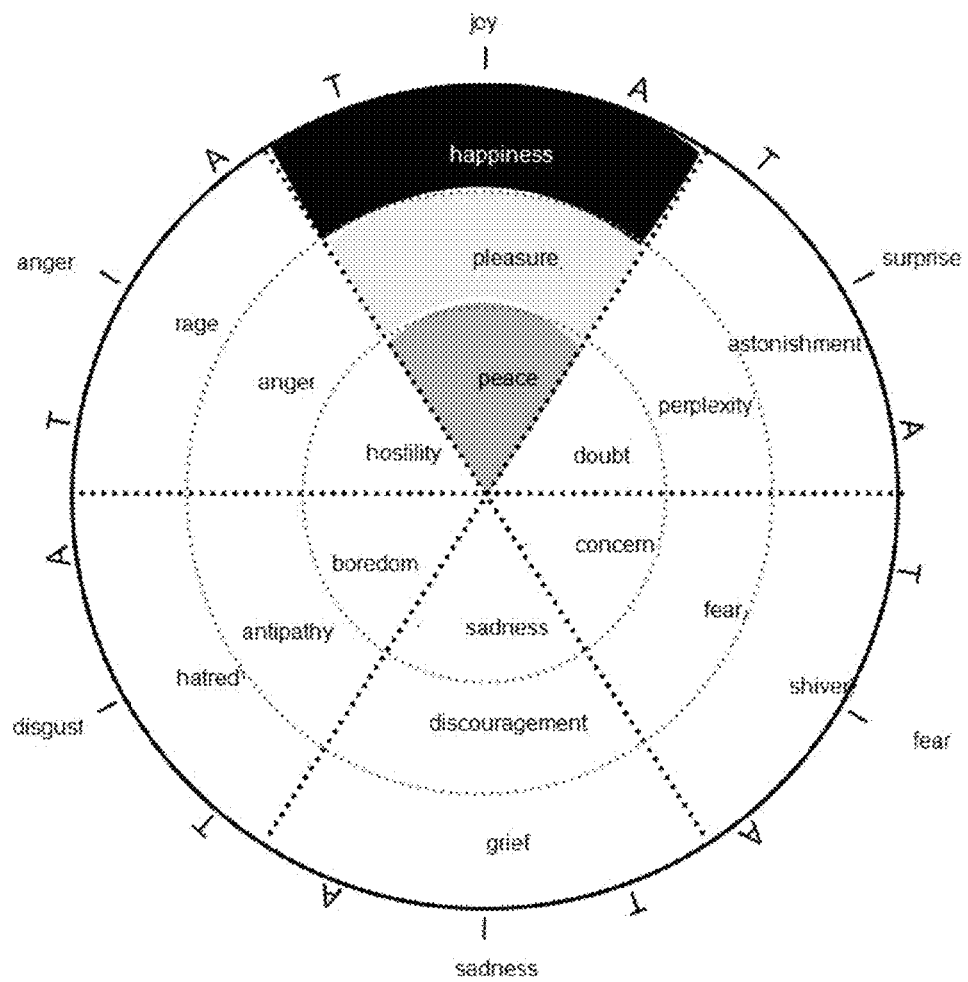

For example, the display controller 230 may indicate the selection degrees of emotions by controlling the brightness levels of emotion zones corresponding to the emotions in proportion to the selection counts of the emotions, as illustrated in FIG. 7. Referring to FIG. 7, "happiness", "peace", and "pleasure" have been selected more frequently in this order.

The display controller 230 may display emotion statistics charts each representing the selection degrees of emotions through brightness control in the vicinity of the popular search keywords, as illustrated in FIG. 8.

When the user selects an emotion statistics chart or one of the plurality of emotion zones in the emotion statistics chart by an input signal, the display controller 230 displays information about a popular search keyword corresponding to the emotion statistics chart to the user in step S330.

For example, upon user selection of an emotion statistics chart by an input signal, the display controller 230 may enlarge the emotion statistics chart or may display an opinion or reply and at least one of emotion statistics by region, emotion statistics by age, emotion statistics by gender, and emotion statistics by time in regard to content related to a popular search keyword corresponding to the selected emotion statistics chart.

In another example, upon user selection of an emotion zone included in a specific emotion statistics chart by an input signal, the display controller 230 may display an opinion or reply and at least one of emotion statistics by region, emotion statistics by age, emotion statistics by gender, and emotion statistics by time in regard to an emotion corresponding to the selected emotion zone for content related to a popular search keyword corresponding to the specific emotion statistics chart.

2. Emotion as Emotion Expression ID

In another embodiment of the present invention, after viewing content, a user may evaluate his/her emotion about the content by means an emotion evaluation UI as illustrated in FIG. 5. For example, the user may evaluate an emotion about the content by selecting an emoticon corresponding to the emotion from among the plurality of emoticons included in the emotion evaluation UI illustrated in FIG. 5. Many other users that have viewed the content may evaluate their emotions about the content in the same manner.

Then the selector 220 selects representative emoticons representing the collected users' emotion evaluations from among the plurality of emoticons in step S340. That is, the selector 220 analyzes the collected users' emotion evaluations and selects an emoticon representing an emotion that most users have felt about content related to each popular search keyword.

The selection of a representative emoticon in the selector 220 will be described below in greater detail.

In a first embodiment of the present invention, the selector 220 may select, as a representative emoticon, an emoticon that users have selected most frequently from among a plurality of emoticons.

For example, if 100 emotion evaluations are performed about articles related to a specific popular search keyword and the emotion evaluations result in 50 selections of emoticon "^0^", 20 selections of emoticon "^_^", and 30 selections of emoticon "^_^;;;", the selector 220 may select the most frequently selected emoticon "^0^" as a representative emoticon for the popular search keyword.

If two or more emoticons are selected most frequently, the selector 220 may select the two or more emoticons as representative emoticons, may select one of the emoticons randomly as a representative emoticon, or may select, as a representative emoticon, one of the emoticons according to a predetermined rule set by a manager (e.g. an emoticon that has been selected most frequently during a recent time period may be selected as a representative emoticon). Representative emoticon(s) may be selected in many other manners.

In a second embodiment of the present invention, the selector 220 may count the number of selecting an emotion for every emotion and select an emoticon representing an emotion that has been selected most frequently by users.

For example, if a total of 100 emoticon selections include 30 selections of emoticon "^0^" representing an emotion (i.e. "happiness") at level 3 of "joy", 25 selections of emoticon "^^;" and 25 selections of emoticon "*^^*", both of which represent an emotion (i.e. "pleasure") at level 2 of "joy", and 20 selections of emoticon "^^;;;" representing an emotion (i.e. "perplexity") at level 2 of "surprise", the selector 220 may count the numbers of selecting the emotions as "happiness: 30, pleasure: 50, and perplexity: 20" and thus may select one (e.g., emoticon "[^_^]") of the emoticons representing the most frequently selected emotion "pleasure" as a representative emoticon.

If two or more emotions are selected most frequently, the selector 220 may select all of emoticons representing the two or more emotions as representative emoticons, may select one of the two or more emotions randomly and then select one of emoticons representing the selected emotion as a representative emoticon, or may select one of the two or more emotions according to a predetermined rule set by a manager (e.g. an emotion that has been selected most frequently in a recent time period should be selected) and then select one of emoticons representing the selected emotion as a representative emoticon. Representative emoticon(s) may be selected in many other manners.

In a third embodiment of the present invention, the selector 220 may count the number of selecting emoticons for every emotion type and may select, as a representative emoticon, an emoticon representing an emotion corresponding to the average emotion level of the most frequently selected emotion type.

For example, if a total of 100 emoticon selections include 20 selections of emoticon "^0^" representing an emotion (i.e. "happiness") at level 3 of "joy", 30 selections of emoticon "^_^" representing an emotion ("peace") at level 1 of "joy", 30 selections of emoticon "^_^;;;" representing an emotion (i.e. "perplexity") at level 2 of "surprise", and 10 selections of emoticon "('o')" representing an emotion (i.e. "fear") at level 2 of "fear", the selector 220 may count the number of selecting emotions for each emotion type and thus obtain the counts as "joy: 60, surprise: 30, and fear: 10", may average the emotion levels of the most frequently selected emotion type "joy" to level 2 (=[(30×3)+(30×1)]/60), and thus may select one "*^^*" of emoticons representing the emotion ("pleasure") at level 2 of "joy" as a representative emoticon.

If two or more emotion types are selected most frequently or the average of emotion levels for an emotion type is the mean of two specific emotion levels, a representative emoticon may be selected in a similar manner to the foregoing first and second embodiments of the present invention.

In a fourth embodiment of the present invention, the selector 220 may calculate the sum of emotion levels to which selected emoticons belong for each emotion type and may select, as a representative emoticon, an emoticon representing an emotion corresponding to the average of the emotion levels of an emotion type having the largest sum.

For example, if a total of 100 emoticon selections include 20 selections of emoticon "^0^" representing an emotion (i.e. "happiness") at level 3 of "joy", 50 selections of emoticon "('?')" representing an emotion ("doubt") at level 1 of "surprise", and 20 selections of emoticon "('o')" representing an emotion (i.e. "fear") at level 2 of "fear", the selector 220 may calculate the sum of emotion levels corresponding to selected emoticons for each emotion type and thus obtain the result of "joy: 60, surprise: 50, and fear: 40". Then the selector 220 may average the emotion levels of the most frequently selected emotion type "joy" to level 3 (=(20×3)/20) and thus may select one "^0^" of the emoticons representing the emotion ("happiness") at level 3 of "joy" as a representative emoticon.

If two or more emoticon types are selected most frequently or the average of emotion levels for an emotion type is the mean of two specific emotion levels, the selector 220 may select a representative emoticon in a similar manner to those illustrated in the foregoing first, second and third embodiments of the present invention.

Besides, the selector 220 may select a representative emotion representing users' emotion evaluations from among a plurality of emoticons in many other manners.

Subsequently, the display controller 230 displays the selected emoticons (i.e. representative emoticons for the users' emotion evaluations) in the vicinity of the respective popular search keywords in step S350.

For example, the display controller 230 may display the representative emoticons to the right of the respective popular search keywords as illustrated in FIG. 9.

Upon user selection of one of the emoticons displayed in the vicinity of the popular search keywords by an input signal, the display controller 230 displays information about a popular search keyword near to the selected emoticon in step S360.

More specifically, the display controller 230 displays at least one of emotion statistics by region, emotion statistics by age, emotion statistics by gender, and emotion statistics by time in regard to the popular search keyword related to the selected emoticon. In this case, the display controller 230 may display the emotion statistics using a plurality of emoticons, colors representing emotion expressions, and various types of graphs.

Figure 10:
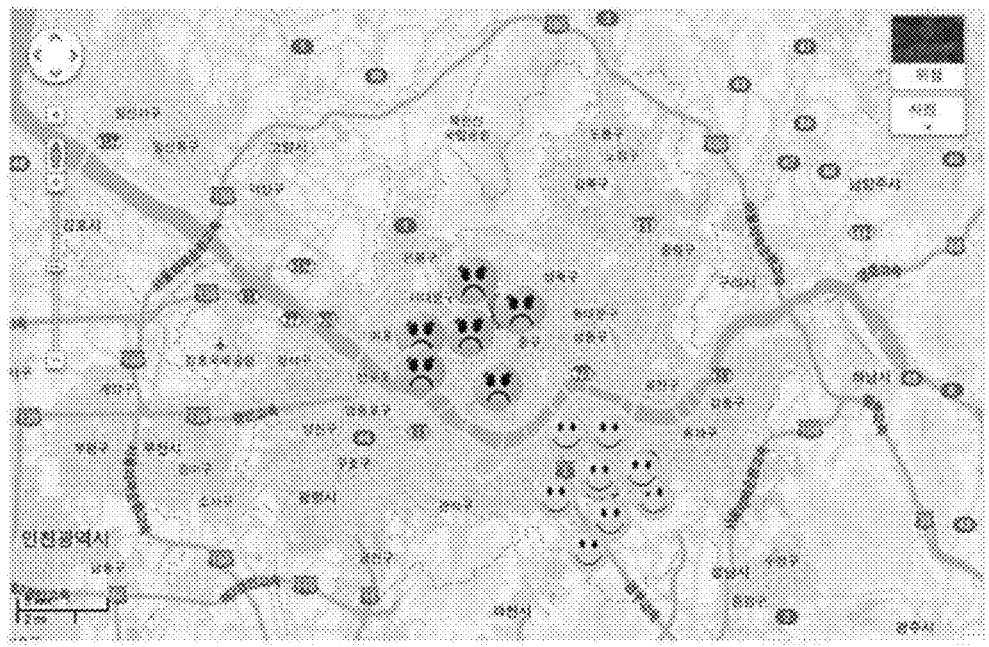
FIGS. 10 to 13 illustrate examples of providing emotion statistics according to an embodiment of the present invention.
Figure 11:
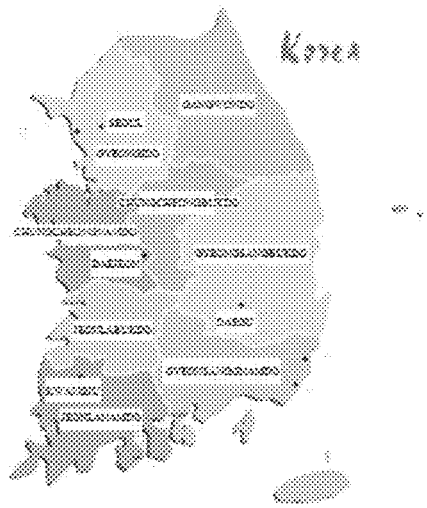

For example, the display controller 230 may display emotion statistics by region for a popular search keyword using emoticons as illustrated in FIG. 10 or using colors representing emotion expressions as illustrated in FIG. 9.

Figure 12:
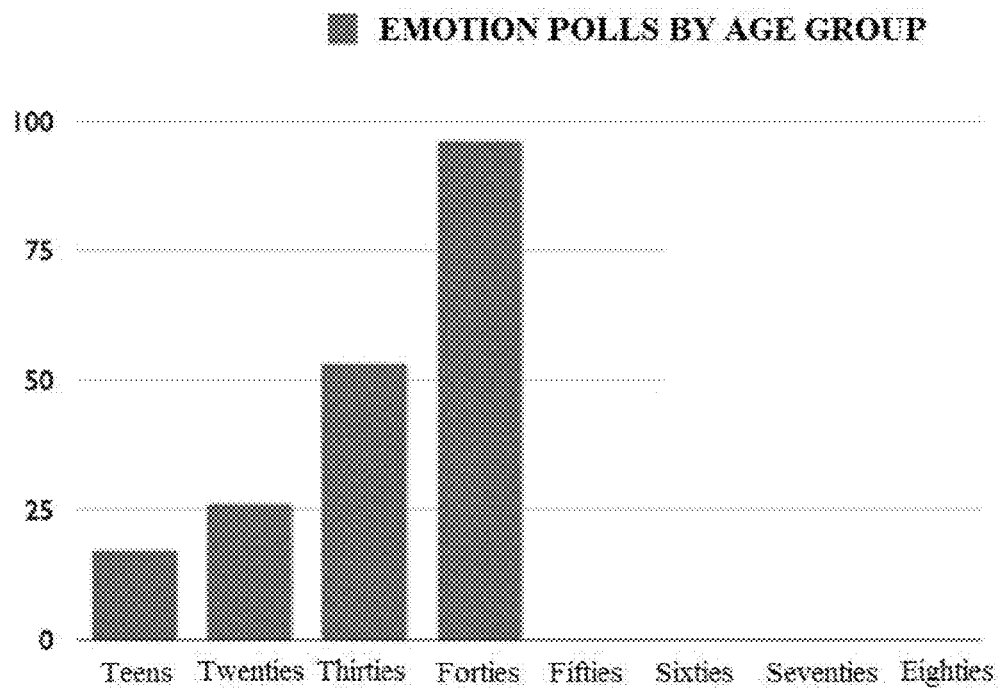

In another example, the display controller 230 may display emotion statistics by age using bar graphs as illustrated in FIG. 12.

Figure 13:
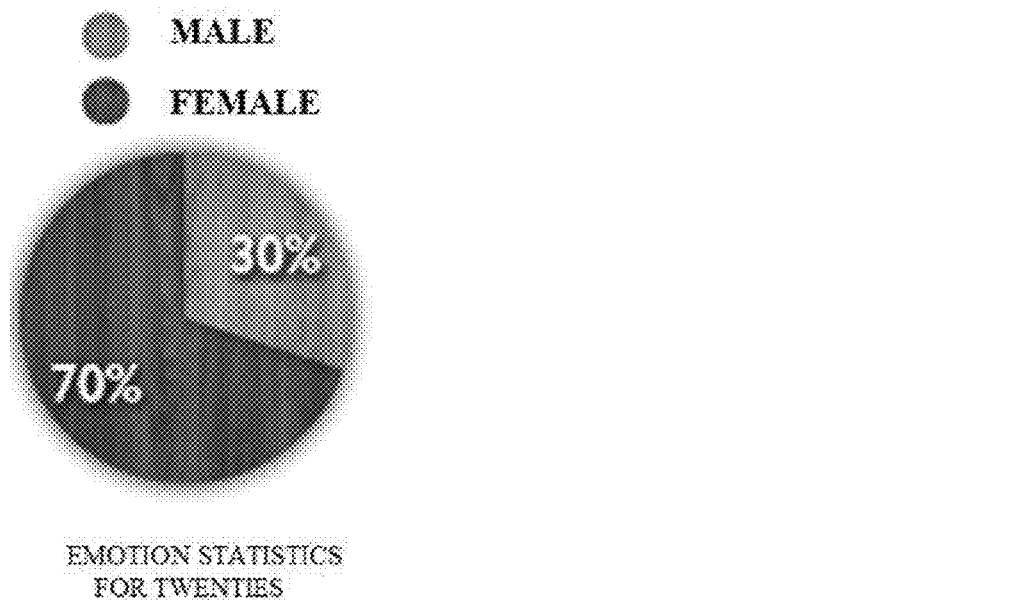

In another example, the display controller 230 may display the emotion statistics by age using a pie chart (i.e. a circle graph) as illustrated in FIG. 13.

As described above, a user can intuitively identify emotion expressions of other users (netizens) in relation to a popular search keyword on a Web page such as a portal site in the present invention.

Further, the present invention can attract more interest in a specific topic from netizens by notifying users' emotion expressions about a recommended search keyword and a user can select only a preferred popular search keyword and thus view related content. Therefore, the present invention can efficiently provide preferred popular search keywords to users.

Figure 14:
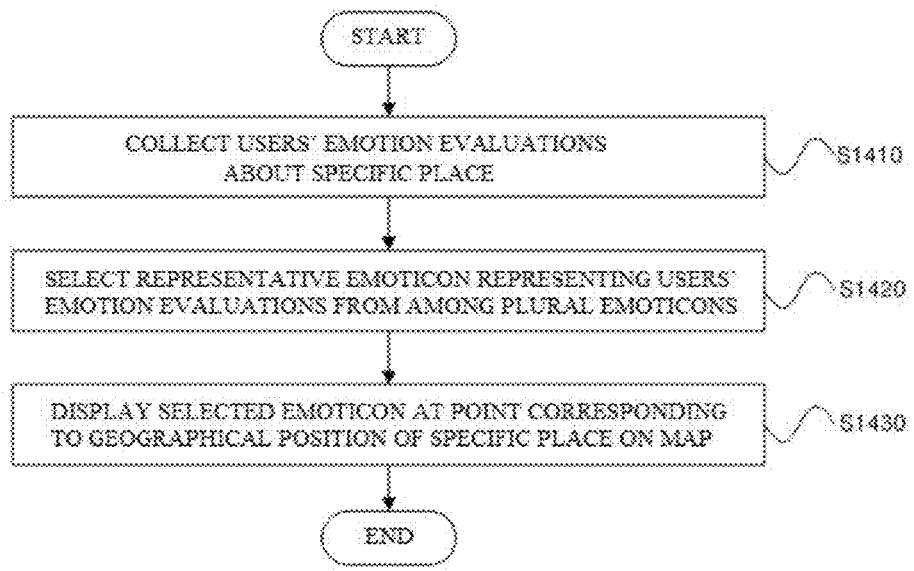
FIG. 14 is a flowchart illustrating a method for providing an emotion expression service using an emotion expression identifier according to another embodiment of the present invention.

FIG. 14 is a flowchart illustrating a method for providing an emotion expression service using an emotion expression identifier according to another embodiment of the present invention.

With reference to FIGS. 2 and 14, operations will be described in detail according to the function of each element and individual steps.

The collector 210 collects users' emotion evaluations about a specific place in step S1410.

In an embodiment of the present invention, the specific place may be a location that provides products or services. For example, the specific place may be a restaurant.

In an embodiment of the present invention, after users view content related to a specific place, such as articles, videos, etc., they may evaluate their emotions about the specific place using an emotion evaluation tool available in the content, as described before. Additionally, after visiting the specific place, the users may evaluate their emotions about the place by various types of Social Networking Service (SNS) services (in this case as well, the same emotion evaluation tool as described above may be used).

The emotion evaluation may be the same as explained in FIG. 3 and thus a detailed description thereof will be omitted herein.

The selector 220 selects a representative emoticon representing the collected users' emotion evaluations from among a plurality of emoticons in step S1420.

The selector 220 selects the representative emoticon in a similar manner to the description given with reference to FIG. 3 and thus emoticon selection will not be described in detail herein.

In step S1430, the display controller 230 displays the selected emoticon (i.e. the representative emoticon representing the users' emotion evaluations) at a point corresponding to the geographical position of the specific place on a map.

Figure 15:
FIG. 15 illustrates an example of displaying emoticons representing emotions on a map according to an embodiment of the present invention.

For example, as illustrated in FIG. 15, the display controller 230 may display emoticons for emotion expressions on a map.

In this manner, the apparatus 200 for providing an emotion expression service using an emotion expression identifier according to the embodiment of the present invention can collect/analyze users' emotion evaluations about a specific place, select a representative emoticon representing the users' emotion evaluations, and display the selected emoticon at a point corresponding to the specific place on a map.

According to the method for providing an emotion expression service using an emotion expression ID, when a word or phrase related to a specific place such as a famous restaurant is input as a search keyword, users' emotion evaluations about the place can be provided while the geographic position of the place is displayed. Accordingly, a user can intuitively identify emotion information about the specific place by place search.

The description of the method for providing an emotion expression service using an emotion expression ID, illustrated in FIG. 3 is also applied to the method for providing an emotion expression service using an emotion expression ID, illustrated in FIG. 14. Thus, a further description of FIG. 14 will be omitted herein.

The embodiments of the present invention may be implemented as code that can be written on a computer-readable recording medium and thus read by a computer. The computer-readable recording medium may include a program command, a data file, a data structure, etc. along or in combination. The program command written to the medium may be specially designed and configured for the present invention or may be known to those skilled in computer software. Examples of computer-readable recording media include magnetic media such as hard disks, floppy disks, and magnetic tapes, optical media such as CD-ROMs and DVDs, magneto-optical media such as floptical disks, and memories such as ROMs, RAMs and flash memories. Examples of program codes include machine language codes written by compilers and premium language codes executable by computers using interpreters. The hardware device can be configured so as to operate as one or more software modules in order to implement the embodiments of the present invention or vice versa.

As is apparent from the above description, the method and apparatus for providing an emotion expression service using an emotion expression identifier according to the present invention enable a user to intuitively identify the emotion expressions of other users (i.e. netizens) in relation to a word or phrase such as a recommended search keyword provided on a Web page such as a portal site.

In addition, as users get to know emotions that other users feel about recommended search keywords, a specific topic can attract much interest from netizens.

The present invention has been described with reference to the limited embodiments and drawings, together with particular features such as specific elements. However, these embodiments are provided to assist in a comprehensive understanding of the invention and are not intended to limit the invention. Those skilled in the art will readily appreciate that various changes and modifications can be made from the description. Therefore, the scope of the invention should not be defined by the illustrated embodiments, and the appended claims and all equivalents or equivalent modifications thereof should be construed as falling within the scope of the invention.

What is claimed is:

1. A method for providing an emotion expression service using an emotion expression identifier, the method comprising:

providing a popular search keyword service relating to users' content, wherein the number of inputs of words or phrases as search keywords in search windows are counted and the search keywords are arranged in order of most searched to least searched;

collecting emotion evaluations of the users' content related to the search keywords of the popular search keyword service, the emotion evaluations being performed by the users after the users' view of the content related to the search keywords, wherein the emotion evaluations comprise counting the number of selecting emotions for every emotion type and selecting a representative emotion expression identifier as an emotion representing an emotion corresponding to an average emotion level of the most frequently selected emotion type about the content related to the search keywords of the popular search keyword service; and displaying the search keywords of the popular search keyword service along with the representative emotion expression identifier representing the collected emotion evaluations of the users in the vicinity of the search keywords on a computer window.

2. The method according to claim 1, wherein the search keywords comprise a recommended search keyword, and the recommended search keyword comprises a popular search keyword and a related search keyword.

3. The method according to claim 1, further comprising, if the representative emoticon is selected by an input signal from the user, displaying an option or a reply and at least one of emotion statistics by region, emotion statistics by age, emotion statistics by gender, and emotion statistics by time, in relation to the content related to the keywords in the vicinity of the selected emotion.

4. The method according to claim 1, wherein the emotion expression identifier comprises an emotion statistics chart, the emotion statistics chart comprises a plurality of emotion zones corresponding to a plurality of emotions defined by at least one of emotion types and emotion levels of the emotion types, and each of the emotion evaluations is performed by selecting one of the plurality of emotions.

5. The method according to claim 4, wherein the displaying of the emotion expression identifier comprises displaying the emotion expression identifier by controlling one of colors, brightness levels, and chroma levels of the plurality of emotion zones based on the number of selecting each of the plurality of emotions.

6. The method according to claim 4, wherein the emotion statistics chart is a pie chart divided into sectors being emotion type zones corresponding to the emotion types, each of which comprises at least one emotion zone, and the at least one emotion zone is arranged sequentially from a center of a circle of the pie chart to a circumference of the circle according to the emotion levels in the emotion type zone.

7. The method according to claim 4, wherein the method further comprises, if the emotion statistics chart is selected by an input signal from a user, enlarging the emotion statistics chart or displaying an opinion or a reply and at least one of emotion statistics by region, emotion statistics by age, emotion statistics by gender, and emotion statistics by time, in relation to the content related to the word or phrase in the vicinity of the selected emotion statistics chart.

8. The method according to claim 7, further comprising, if one of the plurality of emotion zones is selected in the emotion statistics chart by an input signal from the user, displaying an option or a reply and at least one of emotion statistics by region, emotion statistics by age, emotion statistics by gender, and emotion statistics by time, in relation to an emotion corresponding to the selected emotion zone about the content related to the word or phrase in the vicinity of the selected emotion statistics chart.

9. A method for providing an emotion expression service using an emotion expression identifier, the method comprising:

providing a popular search keyword service relating to users' content about a specific place, wherein the number of inputs of words or phrases as search keywords in search windows are counted and the search keywords are arranged in order of most searched to least searched;

collecting emotion evaluations of the users' content about the specific place related to the search keywords of the popular search keyword service, the emotion evaluations being performed by the users after the users' view of the content or visit to the specific place related to the search keywords, wherein the emotion evaluations comprise counting the number of selecting emotions for every emotion type and selecting a representative emotion expression identifier as an emotion representing an emotion corresponding to an average emotion level of the most frequently selected emotion type about the content or the specific place related to the search keywords of the popular search keyword service; and displaying the search keywords of the popular search keyword service along with the representative emotion expression identifier representing the collected emotion evaluations of the users at a point corresponding to a geographical position of the specific place on a map displayed on a computer window.

10. The method according to claim 9, wherein the specific place comprises a product or service providing place.

\* \* \* \* \*